United States Patent
Dieterle et al.

(10) Patent No.: US 10,254,145 B2
(45) Date of Patent: Apr. 9, 2019

(54) LEVEL INDICATOR FEATURING OPTIMIZED ENERGY SUPPLY

(71) Applicant: VEGA GRIESHABER KG, Wolfach (DE)

(72) Inventors: Levin Dieterle, Wolfach (DE); Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 195 days.

(21) Appl. No.: 15/119,284

(22) PCT Filed: Feb. 21, 2014

(86) PCT No.: PCT/EP2014/053432
§ 371 (c)(1),
(2) Date: Aug. 16, 2016

(87) PCT Pub. No.: WO2015/124201
PCT Pub. Date: Aug. 27, 2015

(65) Prior Publication Data
US 2017/0219408 A1 Aug. 3, 2017

(51) Int. Cl.
*G01F 23/284* (2006.01)
*G01S 7/02* (2006.01)
(Continued)

(52) U.S. Cl.
CPC .............. *G01F 23/284* (2013.01); *G01S 7/02* (2013.01); *G01S 13/42* (2013.01); *G01S 13/88* (2013.01); *G01S 13/89* (2013.01); *H01Q 1/225* (2013.01)

(58) Field of Classification Search
CPC ........ G01F 23/284; H01Q 1/225; H01Q 3/10; H01Q 3/14; H01Q 3/34; G01S 13/88; G01S 13/44; G01S 13/426; G01S 13/422
See application file for complete search history.

(56) References Cited

U.S. PATENT DOCUMENTS

| | | | | |
|---|---|---|---|---|
| 2,881,432 A | * | 4/1959 | Hatkin | G01S 13/422 342/158 |
| 3,953,857 A | * | 4/1976 | Jenks | H01Q 3/34 343/705 |

(Continued)

FOREIGN PATENT DOCUMENTS

| | | |
|---|---|---|
| CN | 2861984 Y | 1/2007 |
| CN | 101069071 A | 11/2007 |

(Continued)

OTHER PUBLICATIONS

M. I. Skolnik, "Introduction to Radar Systems"; second edition; McGraw-Hill Book Company; New York, NY, USA; p. 1; copyright year 1980; ISBN 0-07-057909-1. (Year: 1980).*

(Continued)

*Primary Examiner* — Bernarr E Gregory
(74) *Attorney, Agent, or Firm* — Oblon, McClelland, Maier & Neustadt, L.L.P.

(57) ABSTRACT

An antenna apparatus for connection to a fill level measurement device for detecting a topology of a filling material surface is provided, including an antenna configured to emit a measurement signal towards the surface and to receive the measurement signal reflected from the surface; a drive shaft configured to rotate the antenna about the drive axis while the measurement signal is being emitted; a first energy store configured to supply the antenna apparatus with electrical energy, wherein the antenna includes an array of radiator elements configured to emit the measurement signal and to receive the reflected measurement signal, and wherein the first energy store is attached to the antenna apparatus such that it rotates with the antenna when the antenna is rotated by the drive shaft.

12 Claims, 3 Drawing Sheets

(51) Int. Cl.
*G01S 13/88* (2006.01)
*G01S 13/42* (2006.01)
*G01S 13/89* (2006.01)
*H01Q 1/22* (2006.01)
*G01S 13/00* (2006.01)

(56) References Cited

U.S. PATENT DOCUMENTS

| | | | | |
|---|---|---|---|---|
| 4,034,374 A * | 7/1977 | Kruger | | G01S 13/426 342/155 |
| 4,150,378 A * | 4/1979 | Barton | | G01S 13/44 342/107 |
| 4,219,814 A * | 8/1980 | Johnson | | G01S 13/88 266/86 |
| 4,332,374 A * | 6/1982 | Kremer | | G01S 13/88 266/100 |
| 4,814,779 A * | 3/1989 | Levine | | H01Q 3/14 342/375 |
| 5,043,735 A * | 8/1991 | Mawhinney | | G01S 13/88 266/92 |
| 5,148,177 A * | 9/1992 | Nagamune | | G01F 23/284 342/124 |
| 5,245,292 A * | 9/1993 | Milesky | | G01F 23/284 324/639 |
| 6,014,100 A | 1/2000 | Fehrenbach et al. | | |
| 6,759,977 B1 * | 7/2004 | Edvardsson | | G01F 23/284 342/118 |
| 6,928,866 B2 * | 8/2005 | Michalski | | G01F 23/284 324/124 |
| 8,217,831 B2 * | 7/2012 | Poussin | | G01F 23/284 342/118 |
| 2002/0101373 A1 * | 8/2002 | Arndt | | G01F 23/284 342/124 |
| 2004/0074295 A1 | 4/2004 | Michalski et al. | | |
| 2007/0194981 A1 * | 8/2007 | Hagg | | G01F 23/284 342/124 |
| 2009/0299662 A1 | 12/2009 | Fehrenbach et al. | | |
| 2011/0140951 A1 | 6/2011 | Nyberg | | |
| 2012/0194398 A1 * | 8/2012 | Brasile | | H01Q 3/10 343/763 |
| 2012/0221261 A1 | 8/2012 | Fehrenbach et al. | | |
| 2013/0076559 A1 | 3/2013 | Edvardsson | | |
| 2013/0269414 A1 | 10/2013 | Ferraro et al. | | |

FOREIGN PATENT DOCUMENTS

| | | |
|---|---|---|
| CN | 102224398 A | 10/2011 |
| DE | 101 49 851 A1 | 4/2003 |
| EP | 2 128 576 A1 | 1/2009 |
| EP | 2 128 576 A1 | 12/2009 |
| WO | WO 02/063252 A1 | 8/2002 |
| WO | WO 2012/089438 A1 | 7/2012 |

OTHER PUBLICATIONS

International Search Report dated Dec. 1, 2014, in PCT/EP2014/053432 filed Feb. 21, 2014.

* cited by examiner

LEVEL INDICATOR FEATURING OPTIMIZED ENERGY SUPPLY

FIELD OF THE INVENTION

The invention relates to fill level measurement. More particularly, the invention relates to an antenna apparatus for connection to a fill level measurement device, to a fill level measurement device comprising an antenna apparatus, to the use of an antenna apparatus or of a fill level measurement device for determining a viscosity of a liquid, to the use of an antenna apparatus or of a fill level measurement device of this type for determining a mass flow of a bulk material on a conveyor belt, and to a method for determining the topology of a surface of a filling material or bulk material.

BACKGROUND

Fill level measurement devices and other measurement devices that are used for example in the field of monitoring objects are known and emit electromagnetic waves or ultrasound waves in the form of a transmission signal, which are reflected at least in part from the filling material surface or the corresponding object. The transmission signal (measurement signal) which is reflected at least in part can then be received by the antenna unit of the measurement device and analysed by the electronics connected thereto.

By scanning over the surface of the filling material or object, it is possible to determine the topology of the filling material surface or the object, respectively. In the field of fill level measurement, "topology" is understood to mean the shape of the surface of the filling material or bulk material. In this context, the term "topography" can also be used.

In order to supply the measurement devices with electrical energy and transmit the obtained data to an external device, the measurement devices can be equipped with what is referred to as a "four-wire interface".

SUMMARY OF THE INVENTION

An object of the invention is to disclose a fill level measurement device that can detect the topology of a filling material surface and generates high-quality measurement results.

This object is achieved by the features of the independent claims. Developments of the invention may be taken from the dependent claims and from the following description.

A first aspect of the invention relates to an antenna apparatus for connection to a fill level measurement device. The antenna apparatus comprises an antenna unit, a drive shaft and a first energy store. The antenna unit is designed to emit a measurement signal towards a filling material surface or bulk material surface, and to receive the measurement signal reflected from the filling material or bulk material surface. During the measurement, the antenna unit is rotated by a drive shaft about the longitudinal axis of the drive shaft. The first energy store is used for supplying the antenna apparatus with the electrical energy required for the operation thereof. In addition to the generation, emission and receipt of the transmission signal, this operation can also in part include the subsequent signal processing.

For this purpose, the first energy store is attached to the antenna apparatus, for example directly to the rear of the antenna unit, such that it rotates with the antenna unit when said unit is rotated by the drive shaft.

The antenna unit is, for example, an array of individual radiator elements, which is designed to emit the measurement signal and to receive the reflected measurement signal.

The radiator elements of the array can be arranged in a plane which encloses an angle α other than 90° with the rotational axis of the antenna unit for example. The angle α is for example between 30 and 60°, for example 45°.

By providing an angle α other than 90° to the perpendicular direct connection line between the antenna and the filling material surface, the measuring range of the antenna can be widened. As a result of the measuring range being widened, the topography of the filling material surface can be detected to a high quality over a large range of fill levels.

The rotational axis (longitudinal direction of the drive shaft) can, for example, be a vertical rotational axis if the antenna apparatus is mounted on the fill level measurement device and the fill level measurement device is installed in or on a container containing the filling material.

The radiator elements are for example substantially two-dimensional flat patches. However, the radiator elements may also be provided in the form of radiators that have been designed in a different manner.

The array is for example a one-dimensional array comprising a single column of radiator elements. However, the array can also be a two-dimensional array having a plurality of parallel columns and a plurality of rows arranged perpendicularly thereto that are each made up of the individual radiator elements.

According to an embodiment of the invention, the antenna apparatus comprises a high-frequency unit for generating a measurement signal, the high-frequency unit being integrated in the antenna unit or attached thereto. The high-frequency unit can also be integrated in the drive unit of the drive shaft.

According to another embodiment of the invention, the antenna apparatus comprises an evaluation electronics that rotates together with the antenna unit when the antenna unit is rotated by the drive unit.

For example, the evaluation electronics is on the rear of the antenna unit, i.e. on the side facing away from the filling material.

According to another embodiment of the invention, the evaluation electronics is integrated in the antenna unit or in the drive unit.

According to another aspect of the invention, a fill level measurement device for detecting a topology is provided, the fill level measurement device drawing the energy it requires to do so only by means of a two-wire connection, and the two-wire connection being designed for communication, in particular for outputting at least one topology measured value or a measured value derived therefrom (e.g. the mass in the container).

According to another embodiment of the invention, the fill level measurement device is designed to determine a fill level of a filling material and to determine the topology of the surface of the filling material (or a bulk material). Once the topology of the surface has been determined, the fill level can be determined with greater accuracy. The fill level measurement device comprises a main body having a power supply and communications unit for supplying energy to the measurement device and for communicating with an external device. Furthermore, an electric motor is provided, which can also be attached in or to the main body.

In addition, the fill level measurement device comprises an antenna apparatus as described above and in the following. The drive shaft of the antenna apparatus can be connected to the electric motor of the main body if the antenna apparatus is attached to the fill level measurement device. As a result, the electric motor can therefore rotate the drive shaft and thus the antenna unit.

According to another embodiment of the invention, the fill level measurement device comprises a power supply and communications interface for connecting the power supply and communications unit to a two-wire line or a four-wire line, by means of which it is possible to supply the fill level measurement device with the energy required for the measurement operation and by means of which measurement data can be transmitted from the fill level measurement device to a remote control unit.

According to another embodiment of the invention, the fill level measurement device comprises a first stator-rotor pair of coils, which is designed for wirelessly transmitting the energy required for charging the first energy store from the power supply and communications unit of the main body to the antenna apparatus. In other words, the charging energy can thus be transmitted wirelessly. This is advantageous since the antenna apparatus is intended to rotate relative to the main body when the measurement is being taken.

According to another embodiment of the invention, the fill level measurement device comprises a second stator-rotor pair of coils for wirelessly transmitting the measurement signals received by the antenna apparatus from the antenna apparatus to the power supply and communications unit of the main body. Sliding contacts are therefore not necessary.

According to another embodiment of the invention, the fill level measurement device comprises a second energy store for supplying the electric motor with the energy required for rotating the antenna unit. The second energy store is, for example, arranged in the main body of the fill level measurement device and in particular in the stationary part of the fill level measurement device.

According to another embodiment of the invention, the power supply and communications unit of the main body is designed to charge the first and second energy store before the start of a measurement. The fill level measurement device can be programmed such that the measurement is not taken until the two energy stores are sufficiently charged, such that the actual topology and/or fill level measurements can be taken without the need for an external power supply since the required energy is provided only by the two energy stores.

A further aspect of the invention specifies the use of an antenna apparatus as described above and in the following or of a fill level measurement device as described above and in the following for determining further physical characteristics of a moving liquid. For example, the viscosity and/or density of a moving liquid can be determined from the topology of the liquid surface when the agitator geometry and speed are known.

A further aspect of the invention specifies the use of an antenna apparatus as described above and in the following or of a fill level measurement device as described above and in the following for determining a mass flow of a bulk material on a conveyor belt.

A further aspect of the invention specifies a method for determining the topology of a surface of a filling material or bulk material. Firstly, a first energy store arranged in a rotatable region of a fill level measurement device is charged. Prior to this, at the same time or afterwards, a second energy store arranged in a stationary region of the fill level measurement device is charged. The energy required for the charging operations can be provided by means of an external power supply.

Next, the antenna unit of the fill level measurement device is rotated using the electrical energy stored in the second energy store. During the rotation of the antenna unit, a measurement signal is generated and transmitted using the energy stored in the first energy store. The measurement signal reflected from the surface of the filling material or bulk material is then received by the antenna unit, and an arithmetic unit, also referred to as a signal processing unit, computes the topology of the filling material surface from the received measurement data by analysing the reflected received measurement signal.

The measured values from the computation can then be transmitted to a remote control unit by means of a two-wire line, by means of which the energy stores are also supplied with the energy required for the measurement operation.

Alternatively or additionally to the two-wire line, any other communication link can also be provided. In particular, the data can also be transmitted via radio. In this case, the measurement device comprises a radio communications module.

Embodiments of the invention are described below with reference to the drawings.

DETAILED DESCRIPTION OF EMBODIMENTS

Figure 1:
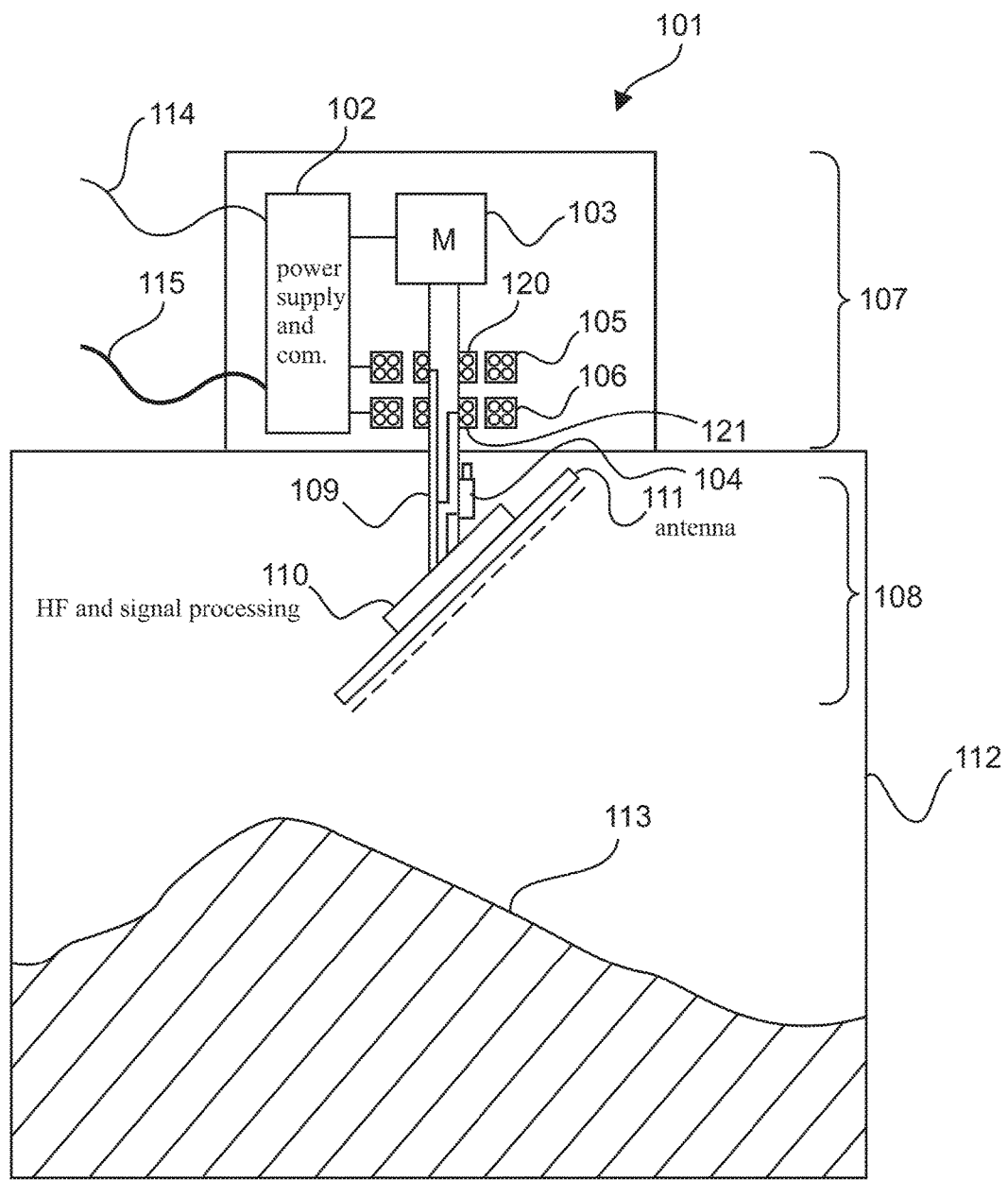
FIG. 1 shows a fill level measurement device installed on a container.

The drawings in the figures are schematic and not to scale.

Where the same reference signs are used in different figures in the following description of the figures, they denote the same or similar elements. However, like or similar elements may also be denoted by different reference numerals.

The present invention can be used in conjunction with fill level measurement devices which comprise at least one transmitting and/or receiving unit, referred to in the following as an "antenna unit", which mechanically rotates about one or more axes while a measurement is being taken. In this respect, particular interest is placed on radar level indicators that record echo curves from different directions in space in the container by the transmitting and/or receiving unit rotating mechanically, and calculate the course (topology) of the surface of the filling material in the container from characteristic values derived from said echo curves. The topology can be output directly by the measurement device or converted into a further characteristic, for example the volume contained in the container or the mass of filling material contained in the container.

FIG. 1 shows a fill level measurement device 101 which records a representation of the reflectance in the container 112 by emitting an electromagnetic or acoustic signal towards a filling material surface 113. In particular, the fill level measurement device can compute the topology of the filling material surface from the measurement signal reflected from the surface 113.

The fill level measurement device 101 contains a power supply and communications unit 102, an electric motor 103, a rotary encoder 104 for determining the orientation of the transmission and/or receiving unit relative to the container 112 and for thus determining how measurement data (distance data) is associated with the topography to be determined, and one stator-rotor pair of coils each for transmitting energy (pair of coils 105, 120) and for transmitting information (pair of coils 106, 121) between the "stationary" region 107 of the fill level measurement device and the "rotating" region 108 ("rotor").

The rotating region of the fill level measurement device comprises at least one rotary shaft 109, to which are fastened a high-frequency and signal processing unit 110 and a transmitting and/or receiving unit 111, for example in the form of a planar antenna. It should be noted in this context that the rotary shaft 109 of the rotating region 108 can be inserted in part into the stationary region 107 in order to couple therein to the motor 103.

During the operation of the fill level measurement device, the electric motor 103 is supplied with electrical energy by the power supply unit 102, after which the rotor 108 of the measurement device is made to rotate. At the same time, the energy supply unit 102 transmits energy to the rotor by means of the first stator-rotor pair of coils 105, 120, in particular to the high-frequency unit of the high-frequency and signal processing unit 110.

By interacting with the signal processing unit of the high-frequency and signal processing unit 110, the high-frequency unit, which is attached for example to the rear of the antenna unit 111, detects the reflectance in various regions of the container 112, in particular in the region of the filling material surface 113. Next, the signal processing unit (also referred to above as the evaluation electronics) can determine the topology of the filling material surface or characteristics derived therefrom, and can communicate this back to the communications unit 102 by means of the second stator-rotor pair of coils 106. The communications unit (which can also be designed to control the power supply and will then be denoted in this context as the power supply and communications unit) can then transmit the determined values to an external unit.

For this purpose, a communications interface 115 provided on the communications unit 102 is used, for example an analogue interface (4-20 mA interface) or a digital interface (HART, Profibus, USB, Ethernet, WLAN, GSM).

Since the electric motor 103 has to be operated concurrently with the operation of the high-frequency and signal processing unit 110, the electric power required for the measurement cannot be arbitrarily reduced. More particularly, the measurement device cannot be operated on a 4-20 mA current interface in two-wire technology, via which the measurement device is supplied with energy (loop-powered), since in this case the electric power that can be drawn via the interface is insufficient.

For this reason, the measurement device 101 of FIG. 1 is designed with four-wire technology.

The electric power additionally required for operating the measurement device is supplied externally via a second pair of wires 114.

For example, in the case of the wireless energy transmission described here from the stator unit to the rotor unit, an AC voltage in the range of a few kilohertz is generated in the stator coil 105 by the power supply unit 102, which voltage in turn induces an AC voltage in the range of a few kilohertz in the rotor coil 120. At the same time, the high-frequency unit 110, which is close to the rotor coil 105, has to detect the signals reflected from the filling material surface 113. In this context, in particular in FMCW systems, it is possible to generate an intermediate frequency signal representing the reflectance in the range of 0 Hz to typically 500 kHz. Since the frequency spectra of the energy transmission and the detection of measurement data cross as a result, the measurements may be very inaccurate since the intermediate frequency signal can be distorted by the electromagnetic influences of the energy transmission via the coils 105, 120.

Figure 2:
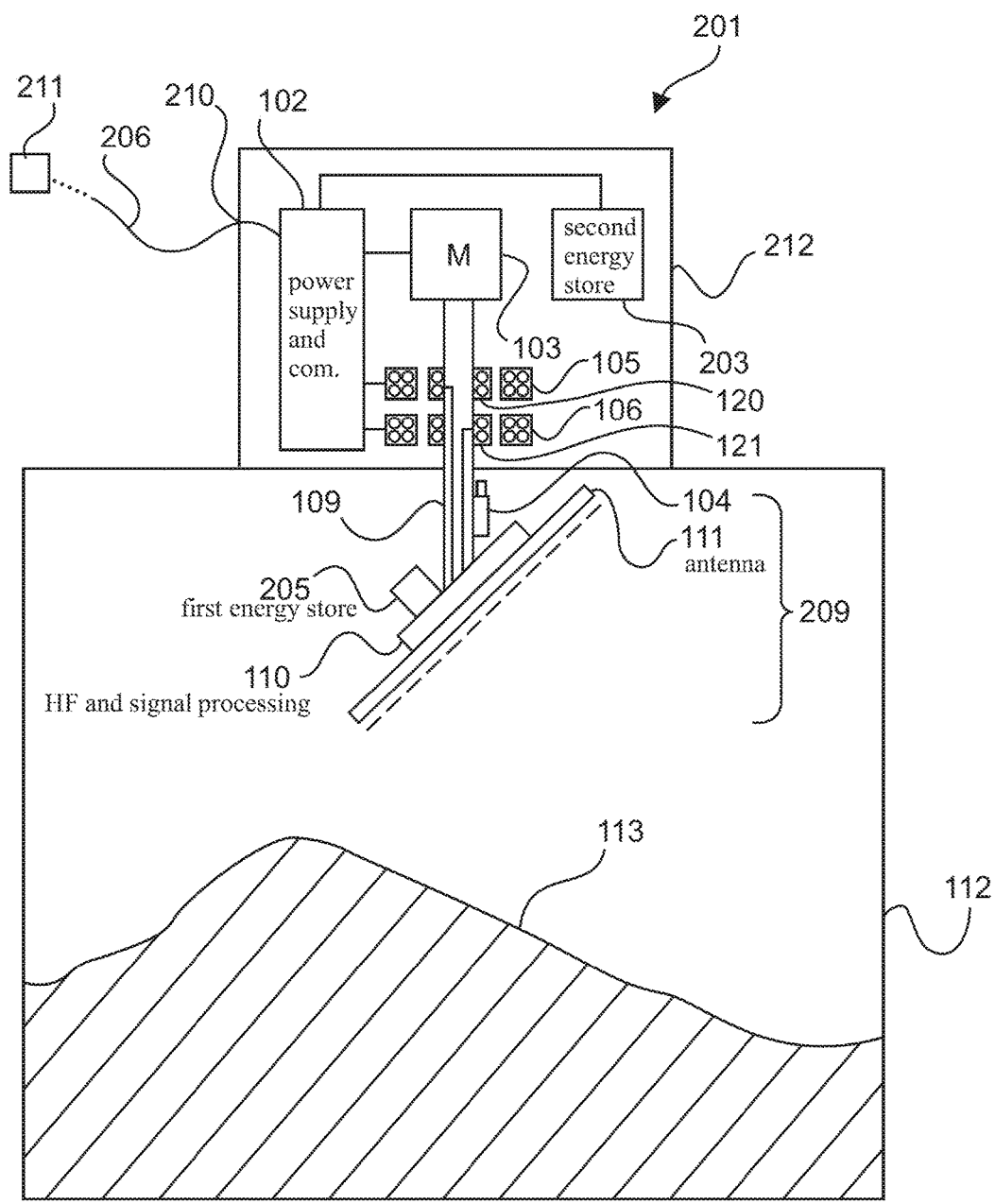
FIG. 2 shows a fill level measurement device according to an embodiment of the invention.

In the following, an apparatus for measuring the topology of a medium in an energy-saving manner will be described, which device allows a corresponding measurement device to be implemented in two-wire technology (loop-powered) and reduces or even eliminates the above-described drawbacks of contactless energy transmission with regard to the distortion of the measurement signal. FIG. 2 shows an embodiment of a corresponding measuring apparatus.

The measurement device 201 can be designed such that all the energy it requires for operation is drawn from a combined power supply and communications line 206 connected to a remote control unit 211. The combined power supply and communications line 206 is, for example, a two-wire connection having analogue 4-20 mA communication.

Since the supply power provided via this interface (typically 40 mW at a voltage of 10 V) for direct operation of the fill level measurement device 201 may not be sufficient, the power supply and communications unit 102 makes use of the provided power to charge at least one first energy store 205, for example a capacitor or an accumulator, located on the rotating region 108 of the fill level measurement device.

The first pair of coils 105, 120 is also used for transmitting energy between the stator part and rotor part. Furthermore, the power supply and communications unit 102 can be designed to make use, in a second step, of the electric power provided to charge a second energy store 203 located in the stator region of the fill level measurement device. The power supply and communications unit 102, the motor 103, the second energy store 203 and the two stator-rotor pairs of coils 105, 120 and 106, 121 are located in the main body 212 of the fill level measurement device. The main body comprises an interface 210 by means of which the power supply and communications unit 102 can be connected to the two-wire line 206.

During the first period of time for collecting electrical energy, the high-frequency unit and the signal processing unit are both in an energy-saving mode ("power down mode"), into which they have been placed beforehand by the power supply and communications unit 102 in the course of communication by means of the second stator-rotor pair of coils 106, 121.

The electric motor 103 can also be deactivated in order to prevent the aforementioned energy collection phase from being unnecessarily prolonged.

If the power supply and communications unit 102 establishes that the two energy stores 203, 205 are sufficiently charged, it activates the high-frequency and signal processing unit 110 by means of the communications interface 106, 121 provided if a new measurement is to be taken.

At the same time, the electric motor 103 is activated, upon which it rotates the antenna unit once or multiple times about the drive shaft 109.

During this phase, the supply power required for operating each component is drawn from the stationary energy store 203 and the rotating energy store 205. There is thus no need to actuate the power supply coils 105, 120 during the measurement using high-frequency signals.

After completion of the measurement, the power supply and communication unit 102 deactivates both the motor 103 and the high-frequency unit of the high-frequency and signal processing unit 110.

The signal processing unit of the high-frequency and signal processing unit 110 then computes the topology of the surface 113 of the filling material or bulk material, and communicates the result values back to the power supply and communications unit 102.

In one embodiment, during this phase energy can be transmitted again from the stator unit to the rotor unit by means of the energy supply coils 105, 120, since the interference-prone data detection in the course of the high-frequency measurement has already ended.

The signal processing unit of the high-frequency and signal processing unit 110 provides the determined value(s) externally, for example via the supply line 206, until the update in the next measurement operation, in which new values are determined. This is carried out, for example, in analogue (4-20 mA) and/or digitally (HART).

Figure 3:
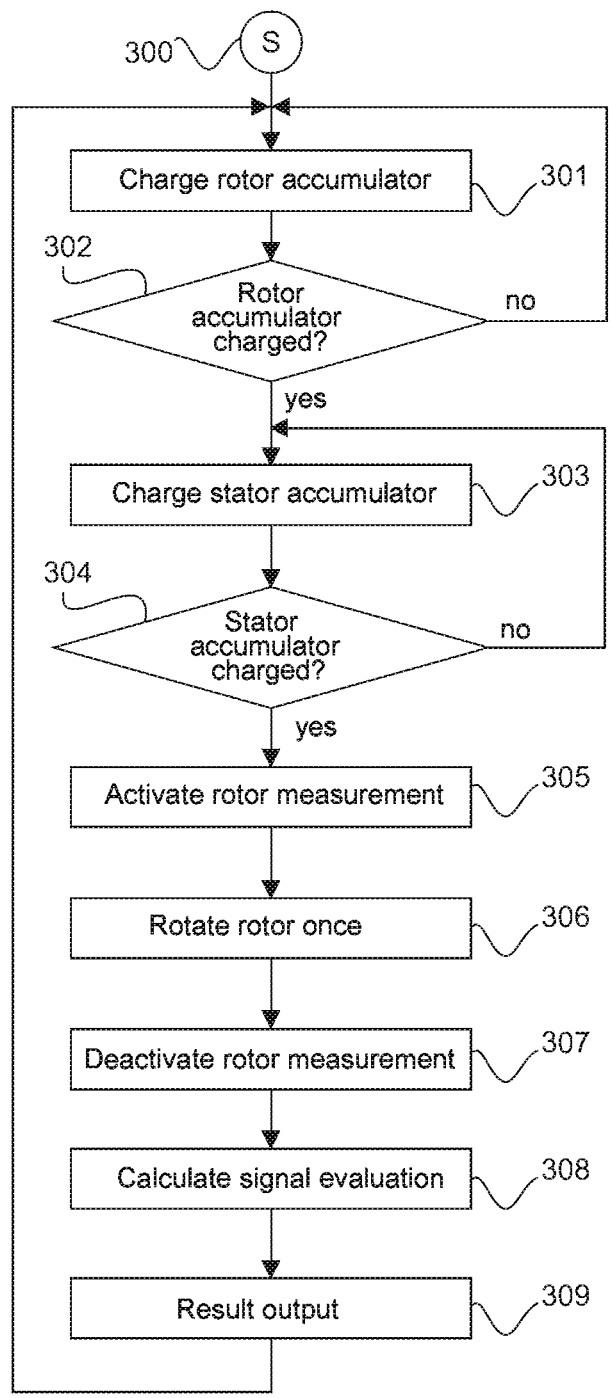
FIG. 3 is a flow chart of a method according to an embodiment of the invention.

FIG. 3 is a flow chart of a method according to an embodiment of the invention. The method is suitable for operating the measurement device 201 described above. The method starts in the starting state 300. In step 301, the rotor accumulator 205 (first energy store) is firstly charged. Then, in step 303, the stator accumulator 203 (second energy store) is charged. These operations can also take place the opposite way around or simultaneously.

If the stator accumulator is filled with a sufficient amount of energy, the measurement in the rotor part is activated in step 305. In step 306, the rotation of the rotor is also activated. During this, the actual measurement data are detected by the high-frequency and signal processing unit 110.

In step 307, the measuring is deactivated (by the rotor and the high-frequency unit being switched off), after which in step 308 the signal processing determines the values to be determined (topology, mass, volume and/or fill level).

After this determination is complete, the results are transmitted to the communications unit 202 in the final step, step 309, and output by means of the supply line 206. The signal processing unit 110 is then deactivated and the method begins again with the energy stores being charged (step 301).

The sequence described here is an example sequence of steps that can be executed in the measurement device. It goes without saying that other sequences are possible, for example concurrent charging of the two energy stores, or the addition of additional charging cycles with deactivation of power-intensive assemblies, for example between the data detection and the calculation of the results by means of the signal processing unit. It can also be possible to use a particularly energy-saving motor to implement direct operation from the energy currently being drawn by the sensor (measurement device) via the supply line 206, in which case the energy store 205 is also used for powering the high-frequency and signal processing unit 110. In this case, the energy store 203 can be dispensed with.

It is also pointed out that the transmission of energy and information from the stator 107 to the rotor 108 by means of coils is only one possible variant. On its rotating unit, the measurement device comprises an energy store that is charged in a first period of time and provides the energy required for the high-frequency unit during the measurement. As a result, there is no need for wireless energy transmission to the rotating sensor part during the measurement, which can prevent or at least reduce the distortion of the measurement by EMC noise.

For completeness, it should be noted that "comprising" and "having" do not exclude the possibility of other elements or steps, and "one" or "a" does not exclude the possibility of a plurality. It should also be noted that features or steps described with reference to one of the above embodiments may also be used in combination with other features or steps of other above-described embodiments. Reference numerals in the claims should not be treated as limiting.

The invention claimed is:

1. An antenna apparatus for connection to a fill level measurement device, comprising:
    an antenna configured to emit a measurement signal towards the surface and to receive a reflected measurement signal reflected from the surface;
    a rotary drive shaft configured to mount the antenna to a motor of the fill level measurement device and to rotate the antenna about an axis of the drive shaft during emitting of the measurement signal; and
    a first energy store configured to supply the antenna apparatus with electrical energy for operation,
    wherein the antenna comprises an array of radiator elements configured to emit the measurement signal and to receive the reflected measurement signal, and
    wherein the first energy store is attached to the antenna apparatus such that the antenna apparatus rotates with the antenna when the antenna is rotated by the rotary drive shaft.

2. The antenna apparatus according to claim 1, further comprising:
    a high-frequency signal generator configured to generate the measurement signal.

3. The antenna apparatus according to claim 2, wherein the high-frequency signal generator is integrated in the antenna or is attached to the antenna.

4. A fill level measurement device for determining a topology of a surface of a filling material or of a bulk material, comprising:
    a main body including a power supply and communications circuitry, and an electric motor; and
    an antenna apparatus, comprising:
        an antenna configured to emit a measurement signal towards the surface and to receive a reflected measurement signal reflected from the surface,
        a rotary drive shaft configured to be connected to the electric motor, to mount the antenna to a motor of the fill level measurement device, and to rotate the antenna about an axis of the drive shaft during emitting of the measurement signal, and
        a first energy store configured to supply the antenna apparatus with electrical energy for operation,
        wherein the antenna comprises an array of radiator elements configured to emit the measurement signal and to receive the reflected measurement signal, and
        wherein the first energy store is attached to the antenna apparatus such that the antenna apparatus rotates with the antenna when the antenna is rotated by the rotary drive shaft.

5. The fill level measurement device according to claim 4, further comprising:
    a power supply and communications interface configured to connect the power supply and communications circuitry to a two-wire line, to supply the fill level measurement device with energy for measurement operation, and to transmit measurement data to a remote controller.

6. The fill level measurement device according to claim 4, further comprising:
    a first stator-rotor pair of coils configured to wirelessly transmit energy for charging the first energy store from the power supply and communications circuitry of the main body to the antenna apparatus.

7. The fill level measurement device according to claim 6, further comprising:
a second stator-rotor pair of coils configured to wirelessly transmit measurement signals received by the antenna apparatus from the antenna apparatus to the power supply and communications circuitry of the main body.

8. The fill level measurement device according to claim 4, further comprising:
a second energy store configured to supply the electric motor with electrical energy for rotating the antenna.

9. The fill level measurement device according to claim 8, wherein the power supply and communications circuitry of the main body is configured to charge the first energy store and the second energy store before a start of a measurement.

10. The fill level measurement device according to claim 4, the device being further configured to determine a viscosity and/or a density of a moving liquid.

11. The fill level measurement device according to claim 4, the device being further configured to determine a mass flow of a bulk material on a conveyor belt.

12. A fill level measurement device for determining a topology of a surface of a filling material or of a bulk material, comprising:
a main body including a power supply and communications circuitry, and an electric motor;
an antenna apparatus, comprising:
an antenna configured to emit a measurement signal towards the surface and to receive a reflected measurement signal reflected from the surface,
a drive shaft configured to be connected to the electric motor, and to rotate the antenna about a drive axis during emitting of the measurement signal, and
a first energy store configured to supply the antenna apparatus with electrical energy for operation,
wherein the antenna comprises an array of radiator elements configured to emit the measurement signal and to receive the reflected measurement signal, and
wherein the first energy store is attached to the antenna apparatus such that the antenna apparatus rotates with the antenna when the antenna is rotated by the drive shaft; and
a first stator-rotor pair of coils configured to wirelessly transmit energy for charging the first energy store from the power supply and communications circuitry of the main body to the antenna apparatus.

* * * * *